(12) United States Patent
Murakami (10) Patent No.: US 10,451,738 B2
(45) Date of Patent: Oct. 22, 2019

(54) LASER PROCESSING DEVICE AND LASER PROCESSING SYSTEM

(71) Applicant: FANUC CORPORATION, Yamanashi (JP)

(72) Inventor: Yoshinori Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/356,922

(22) Filed: Mar. 18, 2019

(65) Prior Publication Data

US 2019/0212448 A1 Jul. 11, 2019

Related U.S. Application Data

(62) Division of application No. 15/642,558, filed on Jul. 6, 2017.

(30) Foreign Application Priority Data

Jul. 13, 2016 (JP) .................. 2016-138626

(51) Int. Cl.
*G01C 3/08* (2006.01)
*G01S 17/10* (2006.01)
(Continued)

(52) U.S. Cl.
CPC ............ *G01S 17/10* (2013.01); *G01S 7/4812* (2013.01); *G01S 7/4865* (2013.01); *G01S 7/497* (2013.01)

(58) Field of Classification Search
CPC ...... G01S 17/10; G01S 7/4812; G01S 7/4865; G01S 7/497
See application file for complete search history.

(56) References Cited

U.S. PATENT DOCUMENTS

| 8,412,371 B2 | 4/2013 | Komatsu |
| 2007/0075055 A1 | 4/2007 | Komatsu |
| 2016/0139266 A1 | 5/2016 | Montoya et al. |

FOREIGN PATENT DOCUMENTS

| CN | 102794567 A | 11/2012 |
| CN | 103459083 A | 12/2013 |

(Continued)

OTHER PUBLICATIONS

An Office Action issued by the U.S. Patent Office on Apr. 19, 2019, which corresponds to U.S. Appl. No. 15/642,558 and is related to U.S. Appl. No. 16/356,922.

(Continued)

*Primary Examiner* — Samantha K Abraham
(74) *Attorney, Agent, or Firm* — Studebaker & Brackett PC (57) ABSTRACT

An object is to provide a laser processing device and a laser processing system capable of measuring a distance between a work and a processing head accurately and simply and capable of checking the quality of processing in real time during the processing. Provided are: a photodetector that detects the intensity of a processing laser beam split by optical path splitting means, and outputs a detection signal having a signal intensity responsive to the detected intensity together with a time of detection of the intensity; a signal intensity comparing unit that compares the signal intensities of multiple detection signals received from the photodetector; and a detection time comparing unit that compares times of detection of multiple intensities. The signal intensity comparing unit measures a processing quality by comparing the signal intensity of a detection signal received from the photodetector responsive to an incident beam on a work and the signal intensity of a detection signal received from the photodetector responsive to a reflected beam from the work. The detection time comparing unit measures a distance (Continued)

between a laser processing device and the work by comparing times of detection of the intensities.

3 Claims, 4 Drawing Sheets

(51) Int. Cl.
    *G01S 7/481*    (2006.01)
    *G01S 7/486*    (2006.01)
    *G01S 7/497*    (2006.01)

(56) References Cited

FOREIGN PATENT DOCUMENTS

| | | |
|---|---|---|
| CN | 104752267 A | 7/2015 |
| CN | 104772569 A | 7/2015 |
| JP | H08-025072 A | 1/1996 |
| JP | H10-328867 A | 12/1998 |
| JP | 2000-126880 A | 5/2000 |
| JP | 2004-513355 A | 4/2004 |
| JP | 2004-243383 A | 9/2004 |
| JP | 2010-082663 A | 4/2010 |
| JP | 4792901 B2 | 10/2011 |
| JP | 2016-000421 A | 1/2016 |
| JP | 2016-43369 A | 4/2016 |
| WO | 03/103866 A2 | 12/2003 |

OTHER PUBLICATIONS

An Office Action mailed by the German Patent Office dated Apr. 29, 2019, which corresponds to German Patent Application No. 10 2017 211 735.4 and is related to U.S. Appl. No. 16/356,922; partial English translation.

An Office Action issued by the Japanese Patent Office dated Apr. 17, 2018, which corresponds to Japanese Patent Application No. 2016-138626 and is related to U.S. Appl. No. 15/642,558.

An Office Action mailed by the State Intellectual Property Office dated Aug. 30, 2018, which corresponds to Chinese Patent Application No. 201710562309.3 and is related to U.S. Appl. No. 15/642,558.

LASER PROCESSING DEVICE AND LASER PROCESSING SYSTEM

This application is a Divisional of U.S. application Ser. No. 15/642,558 filed Jul. 6, 2017, and is based on and claims the benefit of priority from Japanese Patent Application No. 2016-138626, filed on 13 Jul. 2016, the content of which is incorporated herein by reference.

BACKGROUND OF THE INVENTION

Field of the Invention

The present invention relates to a laser processing device and a laser processing system for processing of a work using a processing laser beam.

Related Art

For laser processing using a laser processing head, a distance between a work and the processing head has been required to be controlled so as to place a focal position of an optical system on the work. A distance between the processing head and the work has not been maintained constantly, particularly in the application of the processing head to remote laser welding performed with a galvanometer scanner gripped by a robot, for example. Hence, for proper processing, the aforementioned distance has been required to be measured and the focal position has been required to be controlled to conform to the measured distance. Further, ability to check the quality of processing in real time during the processing has been required in terms of reducing takt time and quality management.

The above-described problem may be solved by a method disclosed by patent document 1, for example. According to this method, the position of a galvanometer scanner gripped by a robot is measured based on the position of the tip of a hand of the robot. Patent document 2 discloses a method of measuring a distance between a work and a processing head by installing a laser for measurement inside the processing head. There has been a different method of measuring a distance between a work and a processing head by installing a measuring instrument outside the processing head.
Patent Document 1: Japanese Patent No. 4792901
Patent Document 2: Japanese Unexamined Patent Application, Publication No. 2016-000421

SUMMARY OF THE INVENTION

However, the method of patent document 1 finds it difficult to measure a distance between a work and a processing head accurately in consideration of absolute position accuracy of the robot or repeatability. The method of patent document 2 necessitates installation of a light source for distance measurement inside the processing head separately from a light source for processing. This involves a problem of cost increase and a problem relating to space in the processing head. Regarding the method of installing the measuring instrument outside the processing head, simply measuring a distance between the work and the processing head is made difficult by the necessity to provide the measuring instrument separately. Further, the methods described above have not been devised on condition that the quality of processing be checked in real time during the processing.

It is therefore an object of the present invention to provide a laser processing device and a laser processing system capable of measuring a distance between a work and a processing head accurately and simply and capable of checking the quality of processing in real time during the processing.

(1) A laser processing device according to the present invention is a laser processing device (laser processing device 100 described later, for example) for processing of a work using a processing laser beam. The laser processing device comprises: at least one optical path splitting means (optical path splitting means 110-1, 110-2, 110-3, 110-4 described later, for example) that splits the processing laser beam; a photodetector (photodetector 130 described later, for example) that detects the intensity of the processing laser beam split by the optical path splitting means, and outputs a detection signal having a signal intensity responsive to the detected intensity together with a time of detection of the intensity; a signal intensity comparing unit (signal intensity comparing unit 140 described later, for example) that compares the signal intensities of multiple detection signals each being the detection signal received from the photodetector; and a detection time comparing unit (detection time comparing unit 150 described later, for example) that compares times of detection of multiple intensities each being the intensity received from the photodetector. The signal intensity comparing unit measures a processing quality by comparing the signal intensity of a detection signal received from the photodetector responsive to an incident beam on the work resulting from splitting by the optical path splitting means and the signal intensity of a detection signal received from the photodetector responsive to a reflected beam from the work resulting from splitting by the optical path splitting means. The detection time comparing unit measures a distance between the laser processing device and the work by comparing a time of detection of an intensity received from the photodetector responsive to the incident beam and a time of detection of an intensity received from the photodetector responsive to the reflected beam.

(2) In the laser processing device according to (1), the photodetector (photodetector 330-1, 330-2 described later, for example) of the laser processing device (laser processing device 300 described later, for example) may include two or more photodetectors, at least one of the photodetectors may detect the intensity of the incident beam, and at least one of the photodetectors may detect the intensity of the reflected beam.

(3) In the laser processing device according to (1) or (2), the signal intensity comparing unit (signal intensity comparing unit 140, 340 described later, for example) may measure a difference or a ratio between the signal intensity of the detection signal responsive to the incident beam and the signal intensity of the detection signal responsive to the reflected beam.

(4) A first laser processing system according to the present invention (laser processing system 200 described later, for example) comprises a laser oscillator (laser oscillator 220 described later, for example), an oscillator controller (oscillator controller 210 described later, for example) that controls the laser oscillator, and a laser processing device (laser processing device 230 described later, for example) for processing of a work using a processing laser beam oscillated by the laser oscillator. The laser processing device comprises: at least one optical path splitting means (optical path splitting means 240-1, 240-2, 240-3, 240-4 described later, for example) that splits the processing laser beam; and a photodetector (photodetector 260 described later, for example) that detects the intensity of the processing laser beam split by the optical path splitting means, and outputs a detection signal having a signal intensity responsive to the detected intensity together with a time of detection of the intensity. The laser processing system further comprises a signal intensity comparing device (signal intensity comparing device 270 described later, for example) and a detection time comparing device (detection time comparing device 280 described later, for example). The signal intensity comparing device compares the signal intensities of multiple detection signals each being the detection signal received from the photodetector. The detection time comparing device compares times of detection of multiple intensities each being the intensity received from the photodetector. The signal intensity comparing device measures a processing quality by comparing the signal intensity of a detection signal received from the photodetector responsive to an incident beam on the work resulting from splitting by the optical path splitting means and the signal intensity of a detection signal received from the photodetector responsive to a reflected beam from the work resulting from splitting by the optical path splitting means. The detection time comparing device measures a distance between the laser processing device and the work by comparing a time of detection of an intensity received from the photodetector responsive to the incident beam and a time of detection of an intensity received from the photodetector responsive to the reflected beam.

(5) In the laser processing system according to (4), the photodetector of the laser processing device may include two or more photodetectors, at least one of the photodetectors may detect the intensity of the incident beam, and at least one of the photodetectors may detect the intensity of the reflected beam.

(6) A second laser processing system according to the present invention (laser processing system 400 described later, for example) comprises a laser oscillator (laser oscillator 420 described later, for example), an oscillator controller (oscillator controller 410 described later, for example) that controls the laser oscillator, and a laser processing device (laser processing device 430 described later, for example) for processing of a work using a processing laser beam oscillated by the laser oscillator. The laser processing device comprises: at least one optical path splitting means (optical path splitting means 440 described later, for example) that splits the processing laser beam; and a photodetector (photodetector 460 described later, for example) that detects the intensity of the processing laser beam split by the optical path splitting means, and outputs a detection signal having a signal intensity responsive to the detected intensity together with a time of detection of the intensity. The laser processing system further comprises a signal intensity comparing device (signal intensity comparing device 470 described later, for example) and a detection time comparing device (detection time comparing device 480 described later, for example). The signal intensity comparing device compares the signal intensity of the detection signal received from the photodetector with an intensity command value transmitted from the oscillator controller to the laser oscillator. The detection time comparing device compares the time of detection of the intensity received from the photodetector with an oscillation command time transmitted from the oscillator controller to the laser oscillator. The signal intensity comparing device measures a processing quality by comparing the signal intensity of the detection signal received from the photodetector responsive to a reflected beam from the work resulting from splitting by the optical path splitting means with the intensity command value. The detection time comparing device measures a distance between the laser processing device and the work by comparing the time of detection of the intensity received from the photodetector responsive to the reflected beam with the oscillation command time.

(7) In the laser processing system described in (4) to (6), the signal intensity comparing device may measure a difference or a ratio between the signal intensity of the detection signal responsive to the incident beam or the intensity command value and the signal intensity of the detection signal responsive to the reflected beam.

According to the present invention, by using a light source for processing as a light source for measurement, a distance between a work and a processing head can be measured and a processing quality can be checked at the same time.

DETAILED DESCRIPTION OF THE INVENTION

First Embodiment

A first embodiment of the present invention will be described in detail by referring to FIG. 1.

For laser processing using a laser processing device, grasping the position of the laser processing device and that of a work relative to each other is important for obtaining a favorable processing quality. According to the present invention, to calculate a distance between the laser processing device and the work, a time of flight (TOF) method is employed by using a processing light source. More specifically, this method is to measure time of flight of a processing beam from projection of the processing beam to a subject to receipt of a reflected beam, and to multiply the measured time of flight by the speed of flight of the processing beam. Optical path splitting means such as a beam splitter is installed for measurement of the time of flight. According to the first embodiment, an incident beam on a work and a reflected beam from the work both resulting from splitting by the optical path splitting means are measured, and a distance is measured based on a difference between times of detection of these beams. A photodetector capable of detecting a light intensity is used for measurement of the incident beam on the work and the reflected beam from the work. A time difference between incidence of the incident beam on the photodetector and incidence of the reflected beam on the photodetector is determined using times of detection of these beams. Further, by comparing a detected intensity of the incident beam on the work and that of the reflected beam from the work, change in the intensity of the reflected beam relative to the incident beam can be measured, so that a processing quality can be measured based on the state of the reflected beam.

Figure 1:
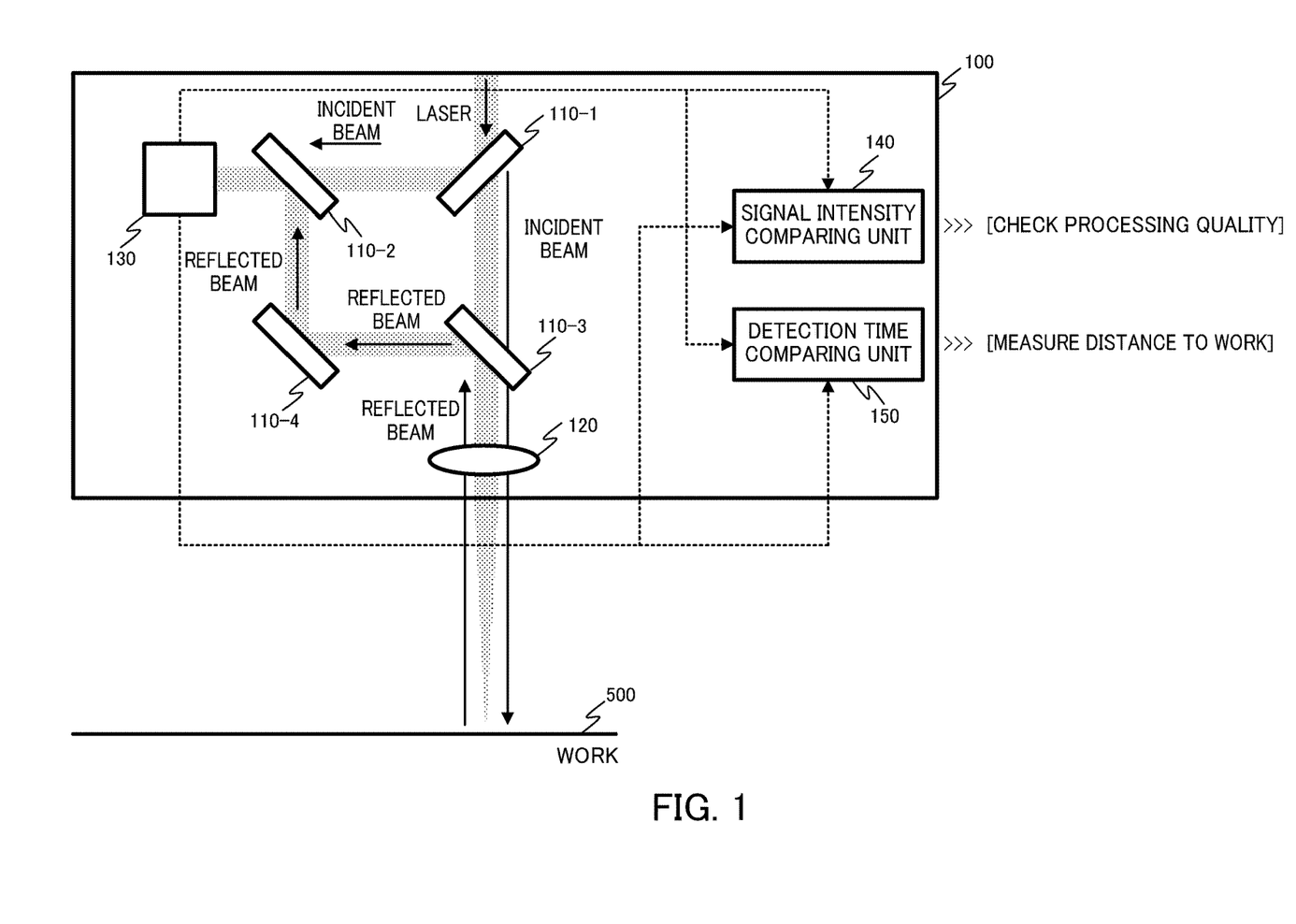
FIG. 1 shows the configuration of a laser processing device entirely according to a first embodiment.

FIG. 1 shows an example of the configuration of a laser processing device 100 according to the first embodiment. The laser processing device 100 includes four optical path splitting means including 110-1, 110-2, 110-3, and 110-4 (these means are collectively called "optical path splitting means 110'''), a focusing lens 120, a photodetector 130, a signal intensity comparing unit 140, and a detection time comparing unit 150.

The optical path splitting means 110 is an optical element that splits a beam in a constant ratio into a transmitted beam and a reflected beam. As described above, a beam splitter is usable as the optical path splitting means 110, for example. The center of each of the four optical path splitting means 110-1 to 110-4 forms a rectangle. Each of the four optical path splitting means 110-1 to 110-4 is arranged in such a manner that a normal to each of the front surface and the back surface of each optical path splitting means, viewed from an incident beam or from a reflected beam, forms an angle of 45 degrees or 135 degrees with a side of the above-described rectangle. The photodetector 130 includes a photo-detecting unit not shown in the drawings arranged on a straight light passing through the center of the optical path splitting means 110-1 and that of the optical path splitting means 110-2 and on an opposite side of the optical path splitting means 110-1 across the optical path splitting means 110-2. The center of the focusing lens 120 is arranged on a straight line passing through the center of the optical path splitting means 110-1 and that of the optical path splitting means 110-3 and on an opposite side of the optical path splitting means 110-1 across the optical path splitting means 110-3.

A laser oscillator and an oscillator controller that controls the laser oscillator, both of which are not shown in the drawings, are provided outside the laser processing device 100. A laser beam emitted from the laser oscillator and incident on the laser processing device 100 first reaches the optical path splitting means 110-1. Then, the laser beam is partially transmitted through the optical path splitting means 110-1 and the other of the laser beam is reflected. The incident beam reflected from the optical path splitting means 110-1 is transmitted through the optical path splitting means 110-2 to enter the photodetector 130. The incident beam transmitted through the optical path splitting means 110-1 passes through the optical path splitting means 110-3 and the focusing lens 120 to collide with a work 500. A beam reflected from the work 500 passes through the focusing lens 120. Then, the reflected beam is reflected from each of the optical path splitting means 110-3, the optical path splitting means 110-4, and the optical path splitting means 110-2 to reach the photodetector 130. By following the above-described routes, both the incident beam on the work 500 and the reflected beam from the work 500 enter the photodetector 130.

The photodetector 130 detects the intensities of both of the following beams having entered the photodetector 130: the incident beam on the work 500 and the reflected beam from the work 500. The photodetector 130 outputs a detection signal having a signal intensity responsive to the intensity of the incident beam on the work 500 together with a time of detection of this intensity. Further, the photodetector 130 outputs a detection signal having a signal intensity responsive to the intensity of the reflected beam from the work 500 together with a time of detection of this intensity. For example, a photodiode is usable as the photodetector 130.

The signal intensity comparing unit 140 compares the following signal intensities received from the photodetector 130: the signal intensity of the detection signal responsive to the incident beam on the work 500 and the signal intensity of the detection signal responsive to the reflected beam from the work 500. Based on a result of this comparison, the signal intensity comparing unit 140 measures the processing quality of laser processing. More specifically, the signal intensity comparing unit 140 makes this comparison by calculating a difference or a ratio between the signal intensity of the detection signal responsive to the incident beam and the signal intensity of the detection signal responsive to the reflected beam.

The detection time comparing unit 150 compares the following detection times received from the photodetector 130: the time of detection of the intensity of the incident beam on the work 500 and the time of detection of the intensity of the reflected beam from the work 500. Based on a result of this comparison, the detection time comparing unit 150 calculates a distance between the laser processing device 100 and the work 500. More specifically, the detection time comparing unit 150 can calculate this distance by determining a time difference between the time of detection of the intensity of the incident beam on the work 500 and the time of detection of the intensity of the reflected beam from the work 500, and using a result of multiplication of the determined time difference by the speed of a processing laser beam.

The operation of the laser processing device 100 as a whole is as follows. If a processing laser beam emitted from the laser oscillator provided outside the laser processing device 100 enters the laser processing device 100, the multiple optical path splitting means 110 split the incident processing laser beam into a beam to be incident on the work 500 and a beam to be reflected from the work 500. Both of these processing laser beams enter the photodetector 130. The signal intensity comparing unit 140 compares the signal intensities of the detection signals responsive to the following beams having entered the photodetector 130: the incident beam on the work 500 and the reflected beam from the work 500. A processing quality can be checked based on a result of this comparison. The detection time comparing unit 150 compares the time of detection of the intensity of the incident beam on the work 500 and the time of detection of the intensity of the reflected beam from the work 500. A distance between the laser processing device 100 and the work 500 can be measured based on a result of this comparison.

According to the above-described first embodiment, a distance between the laser processing device 100 and the work 500 can be calculated without the need of preparing a light source for distance measurement separately from a light source for processing or a device for distance measurement separately from the laser processing device. Further, a processing quality can be evaluated together with distance measurement.

Second Embodiment

Figure 2:
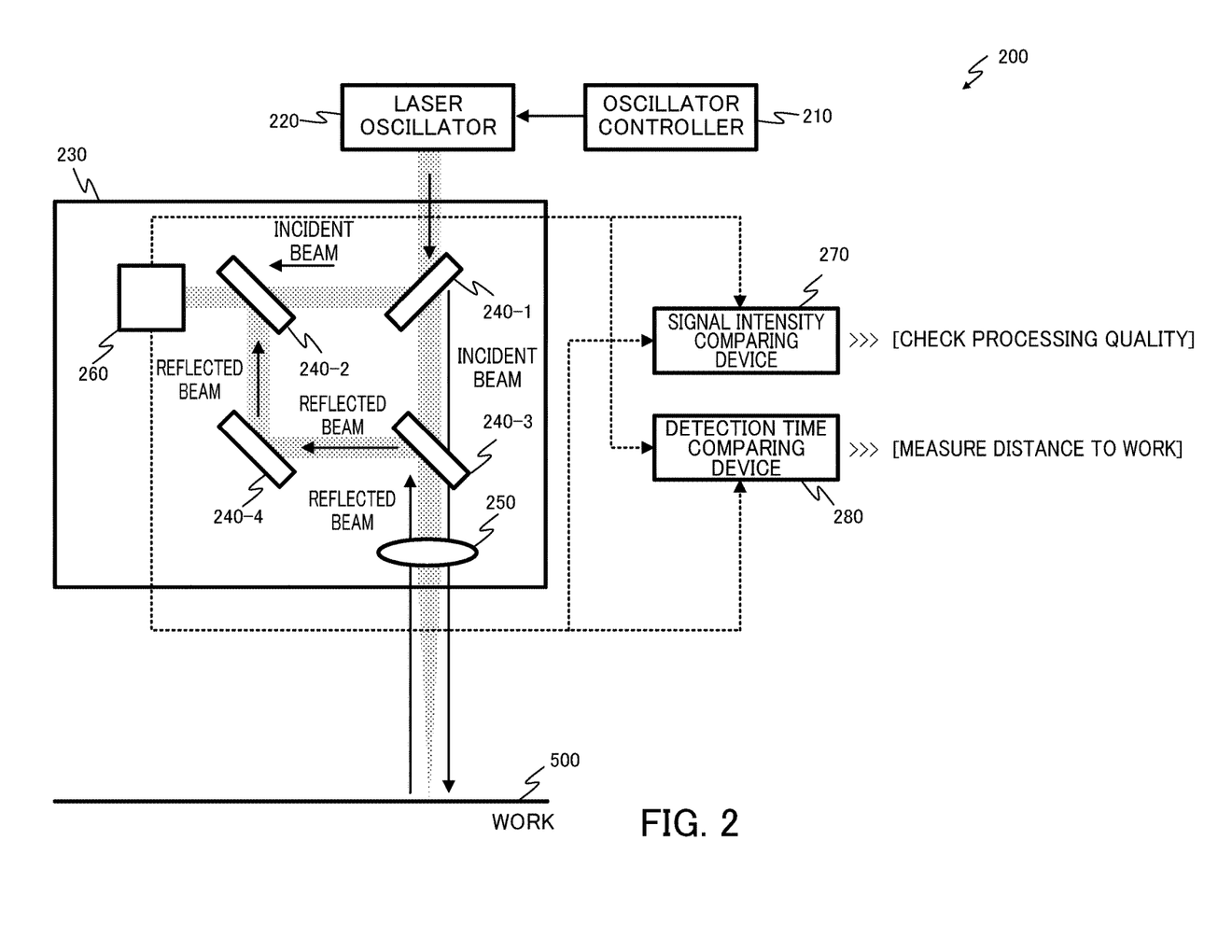
FIG. 2 shows the configuration of a laser processing system entirely according to a second embodiment.

A second embodiment of the present invention will be described in detail by referring to FIG. 2.

According to the first embodiment, the laser processing device 100 includes the signal intensity comparing unit 140 and the detection time comparing unit 150 as its constituting elements. By contrast, according to the second embodiment, instead of providing a signal intensity comparing unit and a detection time comparing unit to the laser processing device 100, a signal intensity comparing device 270 and a detection time comparing device 280 separately from the laser processing device 100 are provided.

More specifically, a laser processing system 200 with a laser processing device 230 according to the second embodiment includes a laser oscillator 220, an oscillator controller 210 that controls the laser oscillator 220, the signal intensity comparing device 270, and the detection time comparing device 280 in addition to the laser processing device 230.

Like the laser processing device 100 according to the first embodiment, the laser processing device 230 includes four optical path splitting means including 240-1, 240-2, 240-3, and 240-4 (these means are collectively called "optical path splitting means 240"), a focusing lens 250, and a photodetector 260. These constituting elements are arranged in the same positions as those of the corresponding constituting elements of the laser processing device 100.

A route of a processing laser beam, the function and the operation of the optical path splitting means 240, those of the focusing lens 250, and those of the photodetector 260 are the same as those of the first embodiment, so that they will not be described here. The function and the operation of the signal intensity comparing device 270 and those of the detection time comparing device 280 are the same as those of the signal intensity comparing unit 140 and those of the detection time comparing unit 150 respectively, so that they will not be described here.

The operation of the laser processing system 200 as a whole is as follows. If a processing laser beam emitted from the laser oscillator 220 provided outside the laser processing device 230 enters the laser processing device 230, the multiple optical path splitting means 240 split the incident processing laser beam into a beam to be incident on the work 500 and a beam to be reflected from the work 500. Both of these processing laser beams enter the photodetector 260. The signal intensity comparing device 270 provided outside the laser processing device 230 compares the signal intensities of detection signals responsive to the following beams having entered the photodetector 260: the incident beam on the work 500 and the reflected beam from the work 500. A processing quality can be checked based on a result of this comparison. The detection time comparing device 280 provided outside the laser processing device 230 compares a time of detection of the intensity of the incident beam on the work 500 and a time of detection of the intensity of the reflected beam from the work 500. A distance between the laser processing device 230 and the work 500 can be measured based on a result of this comparison.

According to the second embodiment, like in the first embodiment, a distance between the laser processing device 230 and the work 500 can be calculated without the need of preparing a light source for distance measurement separately from a light source for processing. Further, a processing quality can be evaluated together with distance measurement.

Third Embodiment

A third embodiment of the present invention will be described in detail by referring to FIG. 3.

The laser processing device according to each of the first and second embodiments includes the multiple optical path splitting means. By contrast, a laser processing device according to the third embodiment includes only one optical path splitting means and includes multiple photodetectors.

Figure 3:
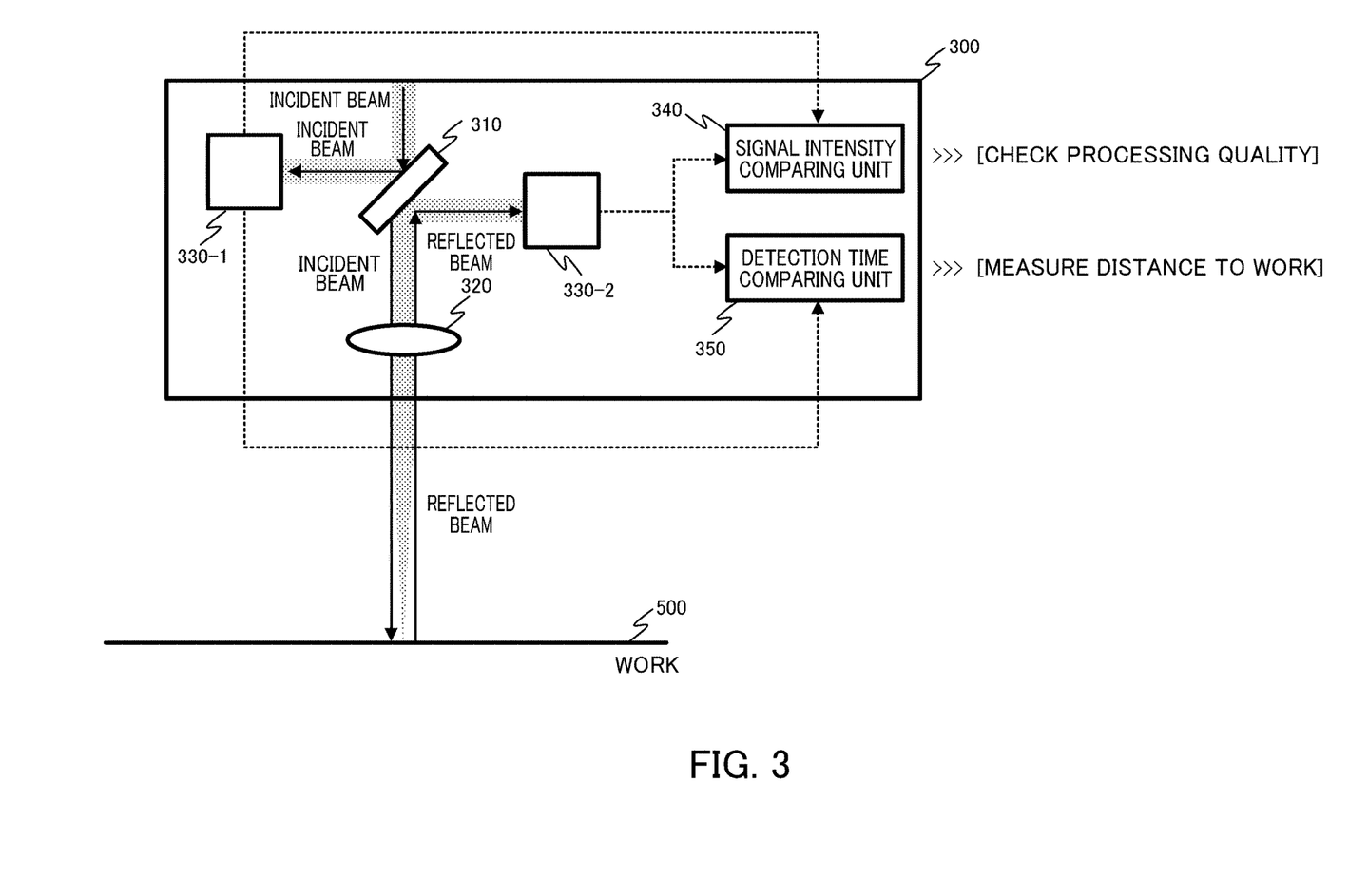
FIG. 3 shows the configuration of a laser processing device entirely according to a third embodiment.

FIG. 3 shows an example of the configuration of a laser processing device 300 according to the third embodiment. The laser processing device 300 includes optical path splitting means 310, a focusing lens 320, a photodetector 330-1, a photodetector 330-2, a signal intensity comparing unit 340, and a detection time comparing unit 350.

Only one optical path splitting means 310 is provided in the laser processing device 300. Both the front surface and the back surface of the optical path splitting means 310, viewed from an incident beam or from a reflected beam, function as reflection surfaces. The optical path splitting means 310 is arranged in such a manner that a normal to each of the front surface and the back surface of the optical path splitting means 310 forms an angle of 45 degrees with the incident beam or the reflected beam. Referring to FIG. 3, on the assumption that a processing laser beam is to enter the laser processing device 300 from above as viewed from the optical path splitting means 310, the photodetector 330-1, the photodetector 330-2, and the focusing lens 320 are arranged to the left and to the right of the optical path splitting means 310, and below the optical path splitting means 310 respectively.

A laser oscillator and an oscillator controller that controls the laser oscillator, both of which are not shown in the drawings, are provided outside the laser processing device 300. A laser beam emitted from the laser oscillator and incident on the laser processing device 300 first reaches the optical path splitting means 310. Then, the laser beam is partially transmitted through the optical path splitting means 310 and the other of the laser beam is reflected. The incident beam reflected from the optical path splitting means 310 enters the photodetector 330-1. The incident beam transmitted through the optical path splitting means 310 passes through the focusing lens 320 to collide with the work 500. A beam reflected from the work 500 passes through the focusing lens 320. Then, the reflected beam is reflected from the optical path splitting means 310 to reach the photodetector 330-2.

The photodetector 330-1 detects the intensity of the incident beam on the work 500 having entered the photodetector 330-1. The photodetector 330-1 outputs a detection signal having a signal intensity responsive to the intensity of the incident beam on the work 500 together with a time of detection of this intensity. The photodetector 330-2 detects the intensity of the reflected beam from the work 500 having entered the photodetector 330-2. The photodetector 330-2 outputs a detection signal having a signal intensity responsive to the intensity of the reflected beam from the work 500 together with a time of detection of this intensity.

The signal intensity comparing unit 340 compares the signal intensity of the detection signal responsive to the incident beam on the work 500 received from the photodetector 330-1 and the signal intensity of the detection signal responsive to the reflected beam from the work 500 received from the photodetector 330-2. Based on a result of this comparison, the signal intensity comparing unit 340 measures the processing quality of laser processing. More specifically, the signal intensity comparing unit 340 makes this comparison by calculating a difference or a ratio between the signal intensity of the detection signal responsive to the incident beam and the signal intensity of the detection signal responsive to the reflected beam.

The detection time comparing unit 350 compares the time of detection of the intensity of the incident beam on the work 500 received from the photodetector 330-1 and the time of detection of the intensity of the reflected beam from the work 500 received from the photodetector 330-2. Based on a result of this comparison, the detection time comparing unit 350 calculates a distance between the laser processing device 300 and the work 500. More specifically, the detection time comparing unit 350 can calculate this distance by determining a time difference between the time of detection of the intensity of the incident beam on the work 500 and the time of detection of the intensity of the reflected beam from the work 500, and using a result of multiplication of the determined time difference by the speed of a processing laser beam.

The operation of the laser processing device 300 as a whole is as follows. If a processing laser beam emitted from the laser oscillator provided outside the laser processing device 300 enters the laser processing device 300, the single optical path splitting means 310 splits the incident processing laser beam into a beam to be incident on the work 500 and a beam to be reflected from the work 500. The incident beam on the work 500 enters the photodetector 330-1. The reflected beam from the work 500 enters the photodetector 330-2. The signal intensity comparing unit 340 compares the signal intensity of the detection signal responsive to the incident beam on the work 500 having entered the photodetector 330-1 and the signal intensity of the detection signal responsive to the reflected beam from the work 500 having entered the photodetector 330-2. A processing quality can be checked based on a result of this comparison. The detection time comparing unit 350 compares the time of detection of the intensity of the incident beam on the work 500 having entered the photodetector 330-1 and the time of detection of the intensity of the reflected beam from the work 500 having entered the photodetector 330-2. A distance between the laser processing device 300 and the work 500 can be measured based on a result of this comparison.

According to the above-described third embodiment, a distance between the laser processing device 300 and the work 500 can also be calculated without the need of preparing a light source for distance measurement separately from a light source for processing or a device for distance measurement separately from the laser processing device. Further, a processing quality can be evaluated together with distance measurement. Additionally, unlike in the first and second embodiments, the intensity and the time of receipt of the incident beam and those of the reflected beam can be acquired by using only one optical path splitting means.

Fourth Embodiment

A fourth embodiment of the present invention will be described in detail by referring to FIG. 4.

According to the first to third embodiments, both the intensity of an incident beam on the work 500 and that of a reflected beam from the work 500 are detected. Based on results of the detection about these beams, a processing quality and a distance between a laser processing device and a work are measured. According to the fourth embodiment, instead of using a result of detection about the intensity of an incident beam, an intensity command value and an oscillation command time of an incident beam contained in oscillation command information transmitted from an oscillator controller to a laser oscillator are acquired. Each of the acquired intensity command value and oscillation command time is compared with a result of detection about the intensity of a reflected beam to measure a processing quality and a distance between a laser processing device and a work.

Figure 4:
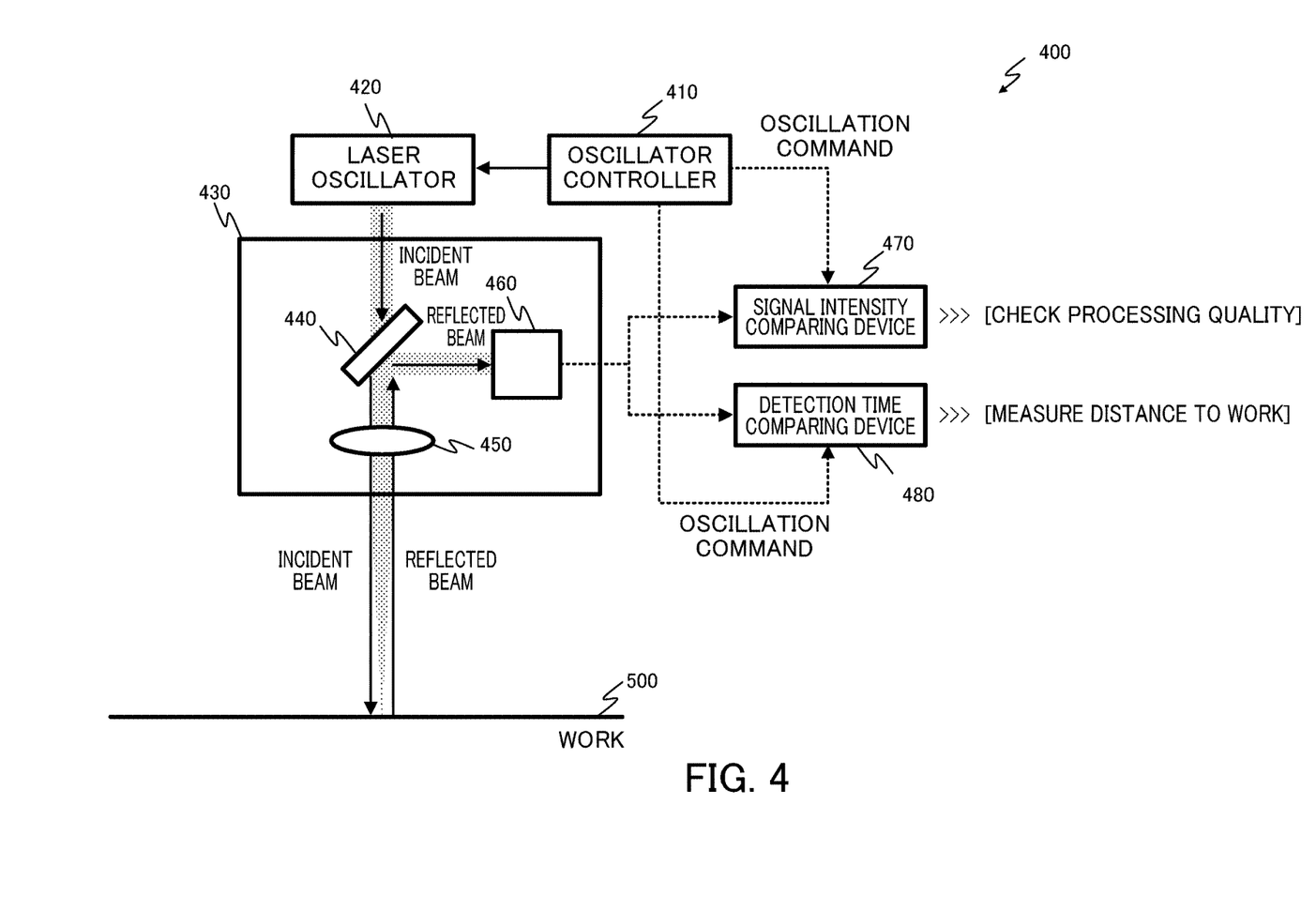
FIG. 4 shows the configuration of a laser processing system entirely according to a fourth embodiment.

FIG. 4 shows an example of the configuration of a laser processing system 400 with a laser processing device 430 according to the fourth embodiment. The laser processing system 400 includes a laser oscillator 420, an oscillator controller 410 that controls the laser oscillator 420, a signal intensity comparing device 470, and a detection time comparing device 480 in addition to the laser processing device 430.

Like the laser processing device 300 according to the third embodiment, the laser processing device 430 according to the fourth embodiment includes single optical path splitting means 440. The optical path splitting means 440 is arranged in such a manner that a normal to each of the front surface and the back surface of the optical path splitting means 440 forms an angle of 45 degrees with an incident beam or a reflected beam. Unlike the laser processing device 300 according to the third embodiment, the laser processing device 430 according to the fourth embodiment does not include a photodetector that detects an incident beam on the work 500 but only a photodetector 460 that detects a reflected beam from the work 500 is provided. Specifically, referring to FIG. 4, on the assumption that a processing laser beam is to enter the laser processing device 430 from above as viewed from the optical path splitting means 440, constituting elements include only the photodetector 460 arranged to the right of the optical path splitting means 440 and a focusing lens 450 arranged below the optical path splitting means 440 in addition to the optical path splitting means 440. The photodetector 460 detects the intensity of the reflected beam from the work 500 having entered the photodetector 460. The photodetector 460 outputs a detection signal having a signal intensity responsive to the intensity of the reflected beam from the work 500 together with a time of detection of this intensity.

Unlike in the laser processing system 200 according to the second embodiment, in the laser processing system 400 according to the fourth embodiment, the oscillator controller 410 transmits an oscillation command containing information about an intensity command value and an oscillation command time of an incident beam to each of the signal intensity comparing device 470 and the detection time comparing device 480 as well as to the laser oscillator 420.

The signal intensity comparing device 470 compares the signal intensity of the detection signal responsive to the reflected beam from the work 500 received from the photodetector 460 and the intensity command value of the incident beam on the work 500 received from the oscillator controller 410. Based on a result of this comparison, the signal intensity comparing device 470 measures the processing quality of laser processing.

The detection time comparing device 480 compares the time of detection of the intensity of the reflected beam from the work 500 received from the photodetector 460 and the oscillation command time of the incident beam on the work 500 received from the oscillator controller 410. Based on a result of this comparison, the detection time comparing device 480 calculates a distance between the laser processing device 430 and the work 500. More specifically, the detection time comparing device 480 can calculate this distance by determining a time difference between the oscillation command time of the incident beam on the work 500 and the time of detection of the intensity of the reflected beam from the work 500, and using a result of multiplication of the determined time difference by the speed of a processing laser beam.

The operation of the laser processing system 400 as a whole is as follows. If a processing laser beam emitted from the laser oscillator 420 provided outside the laser processing device 430 enters the laser processing device 430, the single optical path splitting means 440 splits the incident processing laser beam into a beam to be incident on the work 500 and a beam to be reflected from the work 500. The reflected beam from the work 500 enters the photodetector 460. The signal intensity comparing device 470 compares the signal intensity of the detection signal responsive to the reflected beam from the work 500 having entered the photodetector 460 and the intensity command value of the incident beam on the work 500 received from the oscillator controller 410. A processing quality can be checked based on a result of this comparison. The detection time comparing device 480 compares the time of detection of the intensity of the reflected beam from the work 500 having entered the photodetector 460 and the oscillation command time of the incident beam on the work 500 received from the oscillator controller 410. A distance between the laser processing device 430 and the work 500 can be measured based on a result of this comparison.

According to the above-described fourth embodiment, a distance between the laser processing device 430 and the work 500 can also be calculated without the need of preparing a light source for distance measurement separately from a light source for processing or a device for distance measurement separately from the laser processing device. Further, a processing quality can be evaluated together with distance measurement. Additionally, the intensity and the time of receipt of the incident beam and those of the reflected beam can be acquired by using only one optical path splitting means unlike in the first and second embodiments, and by using only one photodetector unlike in the third embodiment.

The present invention is not limited to the embodiments described above. The effects described in the present embodiments are merely given to list most preferable effects achieved by the present invention. Effects achieved by the present invention are not to be limited to those described in the present embodiments.

A method of processing using the laser processing devices 100, 230, 300, and 430, and the laser processing systems 200 and 400 is realized by software. If this method is to be realized by software, programs for configuring this software are installed on a computer (laser processing device 100, 230, 300, or 430). These programs may be recorded on a removable medium and then distributed to a user. Alternatively, these programs may be distributed to the user by being downloaded to a computer of the user through a network. Still alternatively, these programs may be provided to the computer of the user (laser processing device 100, 230, 300, or 430) in the form of web service offered through a network without being downloaded on the computer.

EXPLANATION OF REFERENCE NUMERALS 100, 230, 300, 430 Laser processing device
110-1, 110-2, 110-3, 110-4, 240-1, 240-2, 240-3, 240-4, 310, 440 Optical path splitting means
120, 250, 320, 450 Focusing lens
130, 260, 330-1, 330-2, 460 Photodetector
140, 340 Signal intensity comparing unit
150, 350 Detection time comparing unit
200, 400 Laser processing system
210, 410 Oscillator controller
220, 420 Laser oscillator
270, 470 Signal intensity comparing device
280, 480 Detection time comparing device
500 Work

What is claimed is:

1. A laser processing system comprising a laser oscillator, an oscillator controller that controls the laser oscillator, and a laser processing device for processing of a work using a processing laser beam oscillated by the laser oscillator,
the laser processing device comprising:
at least one optical path splitting means that splits the processing laser beam; and
a photodetector that detects the intensity of the processing laser beam split by the optical path splitting means, and outputs a detection signal having a signal intensity responsive to the detected intensity together with a time of detection of the intensity,
the laser processing system further comprising a signal intensity comparing device and a detection time comparing device, the signal intensity comparing device comparing the signal intensities of multiple detection signals each being the detection signal received from the photodetector, the detection time comparing device comparing times of detection of multiple intensities each being the intensity received from the photodetector,
the signal intensity comparing device measuring a processing quality by comparing the signal intensity of a detection signal received from the photodetector responsive to an incident beam on the work resulting from splitting by the optical path splitting means and the signal intensity of a detection signal received from the photodetector responsive to a reflected beam from the work resulting from splitting by the optical path splitting means,
the detection time comparing device measuring a distance between the laser processing device and the work by comparing a time of detection of an intensity received from the photodetector responsive to the incident beam and a time of detection of an intensity received from the photodetector responsive to the reflected beam.

2. The laser processing system according to claim 1, wherein the photodetector of the laser processing device includes two or more photodetectors,
at least one of the photodetectors detects the intensity of the incident beam, and
at least one of the photodetectors detects the intensity of the reflected beam.

3. The laser processing system according to claim 1, wherein the signal intensity comparing device measures a difference or a ratio between the signal intensity of the detection signal responsive to the incident beam or the intensity command value and the signal intensity of the detection signal responsive to the reflected beam.

* * * * *